April 17, 1945.   W. H. CHURCHILL   2,373,810
MOUNTING FOR ELECTRICAL CONDUIT BUSHINGS
Filed Jan. 15, 1944
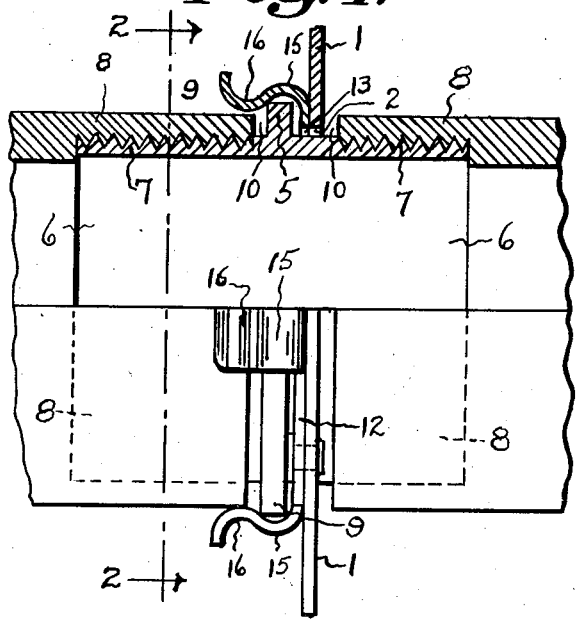
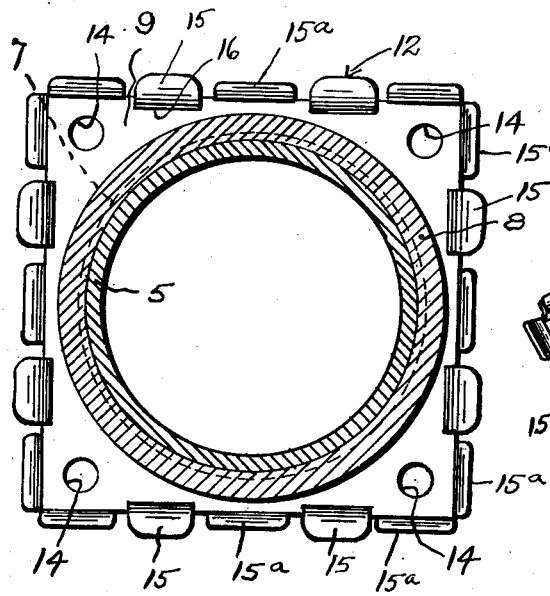
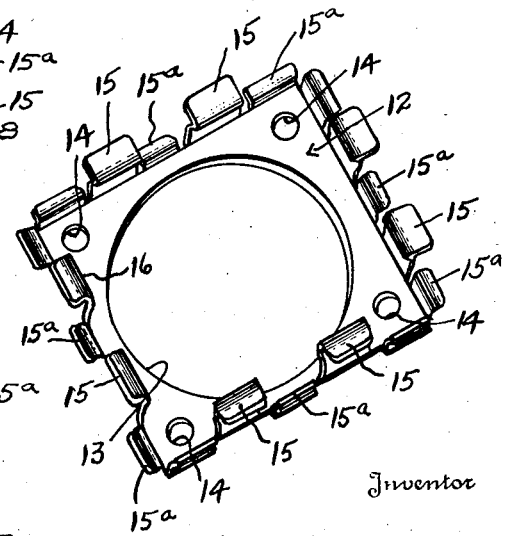
Inventor
Wilmer H. Churchill.
By Walter S. Jones
Attorney Patented Apr. 17, 1945

2,373,810

UNITED STATES PATENT OFFICE 2,373,810

MOUNTING FOR ELECTRICAL CONDUIT BUSHINGS

Wilmer H. Churchill, Saugus, Mass., assignor to United-Carr Fastener Corporation, Cambridge, Mass., a corporation of Massachusetts Application January 15, 1944, Serial No. 518,465

1 Claim. (Cl. 248—56)

The present invention relates to mountings for electrical conduit bushings as well as to the attaching means therefor and aims generally to improve and simplify both the mounting and attaching plate.

In the construction of aircraft, wheeled vehicles, ships, buildings and other structures it is desirable to string electrical conductors through conduits which are supported at spaced intervals in parts of the framework of the structure. Such installations usually include bushings or couplings for connecting lengths of conduit through which the electrical conductors are passed with suitable means for supporting the couplings or conduits from the structure framework.

The present invention is concerned with the improvement and simplification of such installation providing a cheap mounting which is inexpensive in the cost of manufacture and which can be quickly assembled and disassembled thereby facilitating rapid construction of the structure.

Illustrative of the invention, reference is made to the accompanying drawing and annexed specification showing and describing a preferred embodiment of the invention.

In the drawing:

Fig. 1 is a sectional elevation of an electrical conduit installation embodying the invention;

Fig. 2 is a sectional face elevation as taken on the line 2—2 of Fig. 1; and

Fig. 3 is a perspective view of the attaching plate used in the installation.

Referring to the drawing, the installation comprises a support 1 which may be any suitable part of the framework of an aircraft, vehicle, ship, building or other structure, and which support is formed with a relatively large aperture 2 therein.

The electrical conduit which houses the electrical conductors and which is to be supported by the supporting framework 1 comprises a bushing 5 having a tubular barrel portion 6, the opposite ends of which are threaded as at 7 for connection with the internally threaded ends of tubes 8. In the preferred installation the bushing 5 is formed with an outwardly extending peripheral flange 9 intermediate the ends of the barrel, which flange may be of any desired shape. In the illustrated embodiment the flange 9 is rectangular in shape, as shown in Fig. 2.

The threads on the ends of the barrel 6 preferably terminate short of the flange 9 so as to leave spaces 10 between the ends of the tubes 8 and the flange, so as to provide space for the support 1 through the aperture 2 of which a portion of the bushing 5 may extend.

The installation includes attaching means for securing the bushing 5 to the support 1 by a snap fastener action to permit simple and ready assembly and quick emergency disassembly when necessary. Accordingly the invention provides an attaching member preferably in the form of a thin sheet metal plate 12 having an enlarged aperture 13 adapted to align with the opening 2 of the support 1 and permit the passage of the bushing barrel 6 therethrough. The plate preferably conforms to the shape of the bushing flange 9, herein illustrated as rectangular, and is provided with a plurality of apertures 14 for the reception of fastening devices such as rivets or the like for securely attaching the attaching plate 12 to the face of the support 1.

The attaching means has a series of fingers 15 alternating with other fingers 15ᵃ around the periphery of the plate 12, as shown in Figs. 2 and 3. These fingers 15 and 15ᵃ engage the peripheral edge of the flange 9 to hold the bushing in place against rotation. In addition, the fingers 15 have inwardly bent portions 16 which cooperate to snap over the peripheral edge of the flange 9 thereby securely holding the parts of the assembly against accidental disassembly.

Advantages of the invention are that the installation is simple and compact in its construction, cheap in the cost of manufacture and may be very easily and quickly assembled and disassembled for construction and repair.

Although I have illustrated and described a preferred form of my invention, I do not wish to be limited thereby, because the scope of my invention is best defined by the following claim.

I claim:

In combination with a support having an aperture therein, of a conduit bushing having a tubular barrel and an intermediate outwardly projecting peripheral flange thereon, means for attaching said bushing to said support in such position that a portion of the tubular barrel extends through said support opening, said attaching means comprising a relatively thin plate substantially conforming to the peripheral flange of said bushing and securely attached to said support, said attaching plate having an aperture aligned with the support aperture and receiving the tubular barrel portion passed through said support aperture and a plurality of spring fingers normally extending from the peripheral edges of said attaching plate at right angles thereto for snap fastener engagement with the peripheral edge of the bushing flange to hold the bushing in place.

WILMER H. CHURCHILL.